US008305900B2

(12) United States Patent
Bianconi

(10) Patent No.: US 8,305,900 B2
(45) Date of Patent: Nov. 6, 2012

(54) METHODS, SYSTEMS, AND COMPUTER READABLE MEDIA FOR PROVIDING NON-ACCESS STRATUM (NAS) NODE SELECTION FUNCTION (NNSF) WITH CORE NETWORK (CN) NODE BEARER CIRCUIT AVAILABILITY MONITORING AND AVAILABILITY-BASED LOAD SHARING

(75) Inventor: Richard James Bianconi, Rowlett, TX (US)

(73) Assignee: GENBAND Inc., Frisco, TX (US)

( * ) Notice: Subject to any disclaimer, the term of this patent is extended or adjusted under 35 U.S.C. 154(b) by 361 days.

(21) Appl. No.: 12/725,437

(22) Filed: Mar. 16, 2010

(65) Prior Publication Data

US 2011/0228672 A1 Sep. 22, 2011

(51) Int. Cl.
*H04L 12/26* (2006.01)
(52) U.S. Cl. ........................... 370/236; 455/453
(58) Field of Classification Search ............... 370/230, 370/236–238; 455/453
See application file for complete search history.

(56) References Cited

U.S. PATENT DOCUMENTS

| | | | | |
|---|---|---|---|---|
| 2008/0101266 | A1* | 5/2008 | Dahlstedt et al. | 370/310 |
| 2009/0286543 | A1* | 11/2009 | Nath et al. | 455/445 |
| 2010/0097974 | A1* | 4/2010 | Ye et al. | 370/312 |
| 2011/0151878 | A1* | 6/2011 | Xu et al. | 455/444 |
| 2011/0158171 | A1* | 6/2011 | Centonza et al. | 370/328 |

OTHER PUBLICATIONS

Declaration of Richard J. Bianconi (Mar. 16, 2010).
"Feasibility Study on NAS Node Selection Function Above BSC/RNC (Release 9)," 3GPP TR 23.823, v0.2.0 (Feb. 2009).
"Intra-domain Connection of Radio Access Network (RAN) Nodes to Multiple Core Network (CN) Nodes (Release 5)," 3GPP TS 23.236, v5.4.0 (Sep. 2005).

* cited by examiner

*Primary Examiner* — Gary Mui
(74) *Attorney, Agent, or Firm* — Fogarty, L.L.C.

(57) ABSTRACT

The subject matter described herein includes methods, systems, and computer readable media for providing a NAS node selection function with CN node bearer circuit availability monitoring and availability-based load sharing. According to one aspect, the subject matter described herein includes a method for providing a NAS node selection function. The method includes performing various steps at a NAS node selection function which may be integrated with or separate from a media gateway. The method includes monitoring bearer circuit availability for each of a plurality of CN nodes. The method further includes storing an indication of bearer circuit availability for each of the CN nodes. The method further includes receiving initial layer 3 messages from radio access nodes in response to mobile station activity. The method further includes, in response to the messages, assigning mobile stations to the MSCs in a load-sharing manner using the stored indications of bearer circuit availabilities.

21 Claims, 9 Drawing Sheets

METHODS, SYSTEMS, AND COMPUTER READABLE MEDIA FOR PROVIDING NON-ACCESS STRATUM (NAS) NODE SELECTION FUNCTION (NNSF) WITH CORE NETWORK (CN) NODE BEARER CIRCUIT AVAILABILITY MONITORING AND AVAILABILITY-BASED LOAD SHARING

TECHNICAL FIELD

The subject matter described herein relates to assigning mobile stations to core network nodes. More particularly, the subject matter described herein includes methods, systems, and computer readable media for providing a NAS node selection function with CN node bearer circuit availability monitoring and availability-based load sharing.

BACKGROUND

In mobile communications networks, it may be desirable to share core network (CN) node resources among radio access nodes, such as UMTS radio network controllers (RNCs) and GSM base station controllers (BSCs). Conventionally, radio access nodes were restricted to a single core network node. As a result of this strict hierarchy, core node resources were inefficiently used.

3GPP TS 23.236 defines technical requirements for A/Iu-flex, a proposal where radio access nodes, such as RNCs and BSCs, can select any core network node, such as a serving GPRS support node (SGSN) or mobile switching center (MSC) that serves a specific geographic area, referred to as a pool area. The group of CN nodes that serve a pool area is referred to as the MSC pool or the SGSN pool. Allowing access nodes to select from plural CN nodes within a pool area increases the efficiency of utilization of CN node resources.

One problem with the architecture proposed in 3GPP TS 23.236 is that it requires that the intelligence for selecting the CN node to be in the access node, i.e., in the BSC or RNC. However, legacy BSCs and RNCs may not have the capability to perform such selection. In light of the number of BSCs or RNCs in a network, upgrading all of the BSCs or RNCs in a network may be cost-prohibitive. Another problem with the architecture proposed in TS 23.236 is that it does not specify a load-balancing algorithm for balancing the load between available CN nodes. Instead, TS 23.236 indicates that the load-balancing algorithm is "implementation specific."

3GPP TR 23.823 describes an architecture where the NAS node selection function is located above the BSC/RNC. However, like TS 23.236, TS 23.823 indicates that the load-balancing algorithm is implementation specific. In addition, TR 23.823 indicates that the NNSF can be located in a stand-alone intermediary node or co-located with another node, but does not specify the node type with which the NNSF can be co-located.

Accordingly, in light of these shortcomings, there exists a need for methods, systems, and computer readable media for providing non-access stratum (NAS) node selection function with core network (CN) node bearer-circuit availability monitoring and availability-based load sharing.

SUMMARY

The subject matter described herein includes methods, systems, and computer readable media for providing a NAS node selection function with CN node bearer circuit availability monitoring and availability-based load sharing. According to one aspect, the subject matter described herein includes a method for providing a NAS node selection function. The method includes performing various steps at a NAS node selection function which may be integrated with or separate from a media gateway. The method includes monitoring bearer circuit availability for each of a plurality of CN nodes. The method further includes storing an indication of bearer circuit availability for each of the CN nodes. The method further includes receiving initial layer 3 messages from radio access nodes in response to mobile station activity. The method further includes, in response to the messages, assigning mobile stations to the CN nodes in a load-sharing manner using the stored indications of bearer circuit availabilities.

The subject matter described herein for providing an NNSF with CN bearer circuit availability monitoring and availability-based load sharing may be implemented on a non-transitory computer readable medium having stored thereon executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
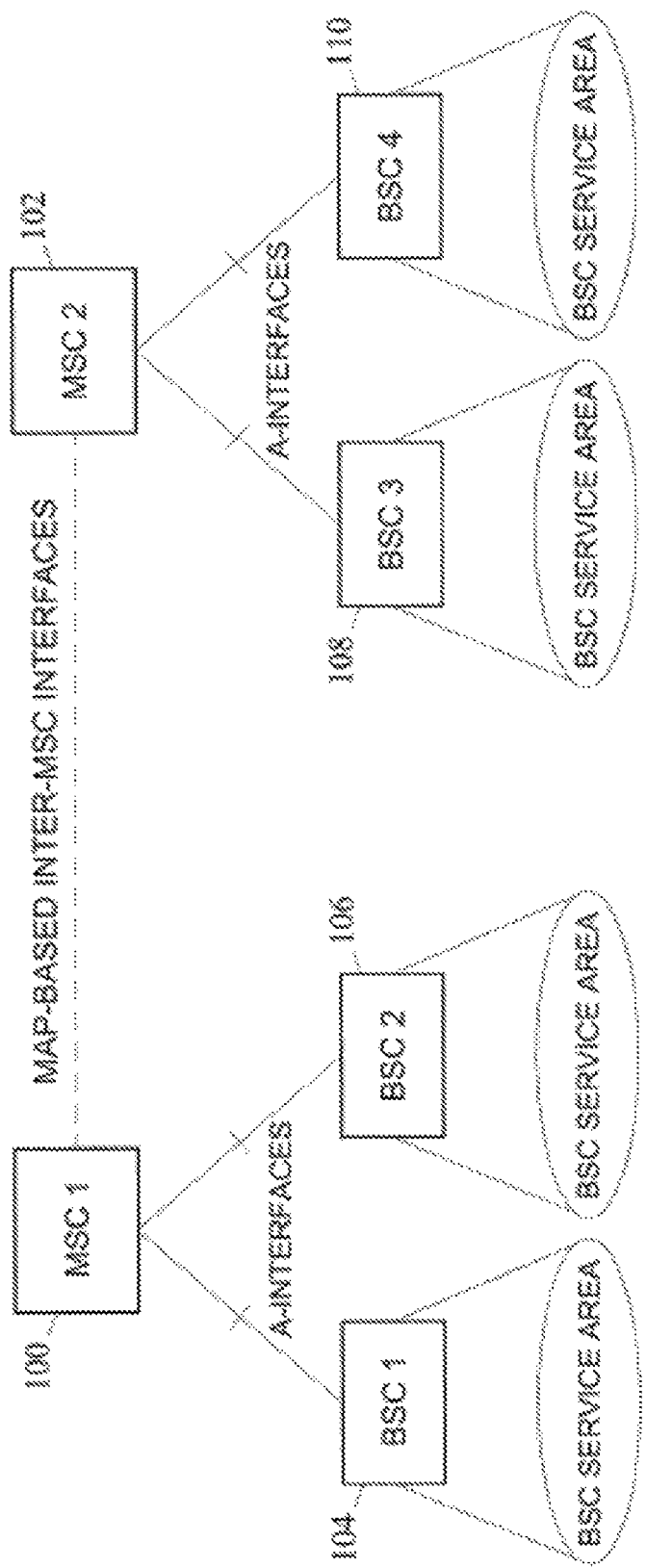
FIG. 1 is a network diagram illustrating fixed association between BSCs and MSCs.

FIG. 1 is a network diagram illustrating a conventional mobile network where each BSC is assigned to a single MSC.

In particular, in FIG. 1, BSCs 104 and 106 are assigned to MSC 100, and BSCs 108 and 110 are assigned to MSC 102. Each BSC 104, 106, 108, and 110 has access to only a single MSC without the ability to utilize resources provided by other MSCs. As a result of this fixed relationship between BSCs and MSCs, there is no ability to load-share the assignment of MSCs to mobile stations.

Figure 2:
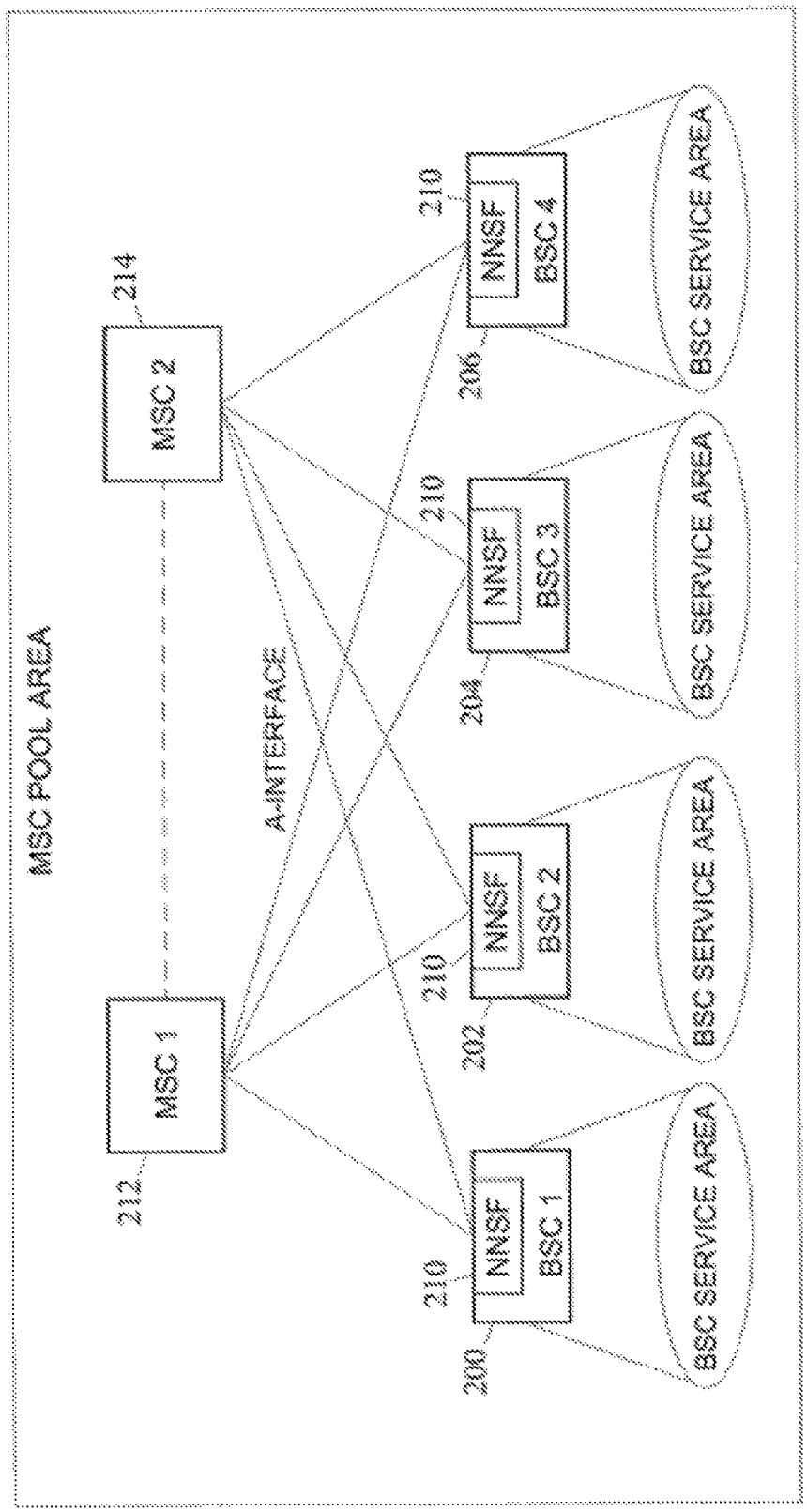
FIG. 2 is a network diagram illustrating exemplary MSC pooling where NNSF functionality is co-located with the BSC nodes.

FIG. 2 illustrates a network as described in 3GPP TS 23.236 where a non-access stratum node selection function (NNSF) is integrated within the BSCs. More particularly, in FIG. 2, each BSC 200, 202, 204, and 206 includes an NNSF 210. NNSF 210 allows multiple MSCs 212 and 214 to be assigned to a given single BSC. However, 3GPP TS 23.236 does not specify the method by which NNSF 210 assigns mobile stations to MSCs. Moreover, requiring that the NNSF be located at the BSC node requires that each BSC nodes be upgraded and is therefore unsuitable for networks with large numbers of legacy BSC nodes without NNSF functions. FIG. 2 also illustrates an MSC pool area, which is the area served by MSCs 212 and 214.

Figure 3:
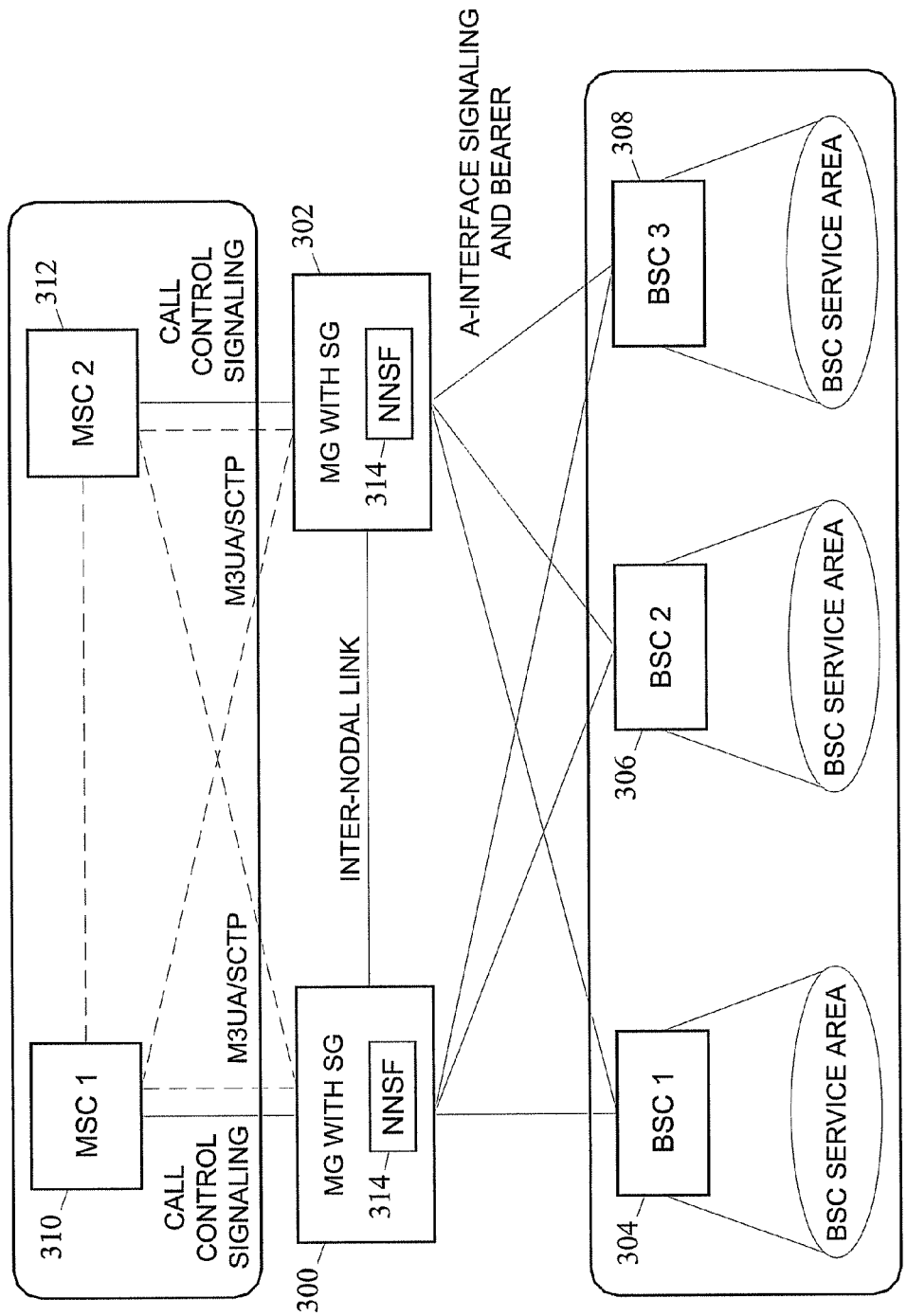
FIG. 3 is a network diagram illustrating a network where the NNSF functionality is co-located with MG and SG functionality and where the NNSF performs bearer circuit availability-based load sharing according to an embodiment of the subject matter described herein.

According to one aspect of the subject matter described herein, an NNSF may be located within a media gateway that resides between the BSCs and the MSCs to allow load-sharing of MSC assignments among mobile stations. In addition, the load-sharing may be based on bearer circuit availabilities of the MSCs. FIG. 3 illustrates an example of a network where the NNSF is integrated with media gateways and where MSCs are assigned to mobile stations using bearer circuit availability-based load sharing according to an embodiment of the subject matter described herein. Referring to FIG. 3, a plurality of media gateways (MGs) 300 and 302 with integrated signaling gateway (SG) functions resides between BSCs 304, 306, and 308 and MSCs 310 and 312. Each media gateway 300 and 302 includes an NNSF function 314. Each NNSF function 314 monitors availability of bearer circuits of each of MSCs 310 and 312 and assigns new mobile stations to MSCs 310 and 312 based on the monitored availabilities and in a load-sharing manner. In the illustrated example, each BSC 304, 306, and 308 is connected to two combined media gateway/NNSF nodes 300 and 302, which are both active and share the load of the subtending BSCs 304, 306, and 308. The SG functions of media gateways 300 and 302 handle SCCP signaling between BSCs 304, 306, and 308 and MSCs 310 and 312 and appear as a single node to the BSCs. The SG functions of media gateways 300 and 302 may share the same local point codes and a single BSC linkset connected to both SGs.

In operation, when a mobile station is first active in a BSC service area, i.e., through initial registration or handover, the serving BSC sends an initial layer 3 message to the MSC assigned to the BSC. For example, BSC 304 may send the initial layer 3 message to MSC 310. NNSF 312 of MG 300 may intercept the initial layer 3 message, determine whether to assign the mobile station to MSC 310 or MSC 312 based on monitored relative bearer circuit availabilities of the MSCs, and assign the mobile station to the MSC with the highest bearer circuit availability. Bearer circuit availability or relative bearer circuit availability between MSCs of equal processing capacity may be determined by comparing the number or percentage of available bearer circuits of each MSC. If one MSC has a higher number or percentage of available bearer circuits than another MSC of the same processing capacity, then the mobile station may be assigned to the first MSC. Monitoring the bearer circuit availability of an MSC may be performed by keeping track of assignments of bearer circuits by each MSC made through the NNSF 314. Moreover, each NNSF 314 may periodically audit each MSC 310 and 312 to determine whether the MSC 310 or 312 has blocked or made circuits available. The auditing may be performed using an operations, administration, and maintenance (OA&M) interface of NNSF 314 to communicate with a corresponding OA&M interface of each MSC. Exemplary OA&M protocols that can be used include proprietary protocols and SNMP. Monitoring bearer circuit availability may also include monitoring bearer circuit maintenance messages generated by BSCs 304, 306, and 308 to inform MSCs 310 and 312 of bearer circuit maintenance or equipment failure events.

In the illustrated example, a pair of NNSFs 314 serves a common subscriber pool, represented by the box surrounding BSCs 304, 306, and 308. In such an embodiment, CIC assignment messages from MSCs 310 and 312 and maintenance messages from BSCs 304, 306, and 308 may go through either NNSF 314. As a result, NNSFs 314 may implement communications to track the state of all the bearer circuits. One option for tracking bearer circuit status information where bearer circuit assignment or maintenance messages are not guaranteed to go through the same NNSF is to have the NNSFs communicate with each other regarding bearer circuit status. Such a solution may lead to consistency problems if an NNSF receives bearer circuit status information from both its mated NNSF and from a BSC or MSC. Another option for tracking bearer circuit operational status is to have the NNSF-MSC audit messages request bearer circuit operational state (free or busy) instead of just the administration state (unblocked or blocked). In such an embodiment, it may be unnecessary for the NNSFs to record CIC assignment messages from the MSCs. In yet another example, each MSC may compute its own bearer circuit availability information as an absolute number or a percentage and send that information to each NNSF. Any method for obtaining bearer circuit availability information for core network nodes is intended to be within the scope of the subject matter described herein.

Figure 4:
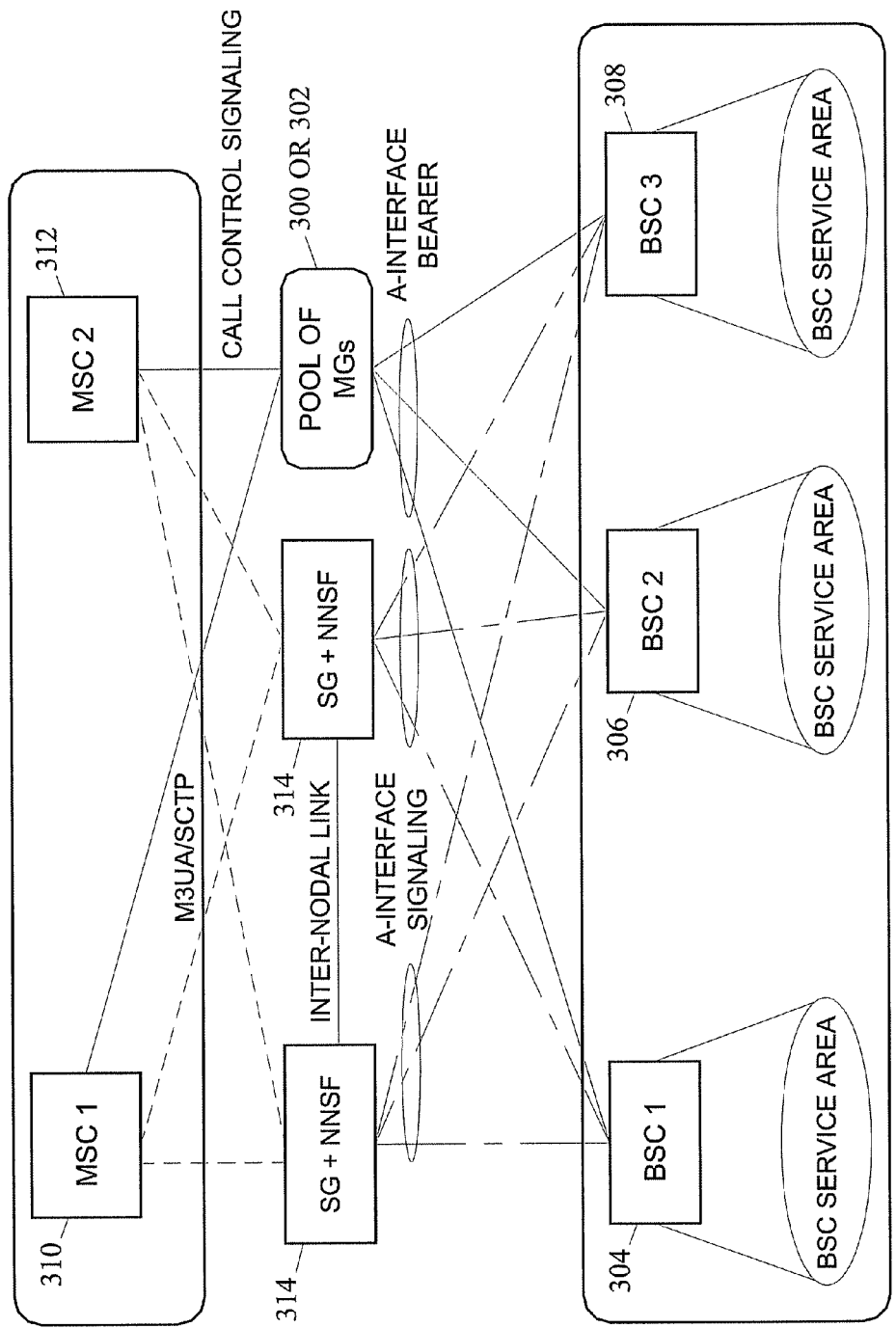
FIG. 4 is a network diagram illustrating an example where SG and NNSF functionality are co-located and where the NNSF performs bearer circuit availability-based load sharing according to an embodiment of the subject matter described herein.

FIG. 4 illustrates an alternate embodiment of the subject matter described herein where NNSF 314 is separate from MG nodes 300 and 302. In FIG. 4, each NNSF 314 is implemented on a platform that hosts a signaling gateway, but not a media gateway. The operation of the subject matter illustrated in FIG. 4 with regard to MSC load sharing is similar to that illustrated in FIG. 3 and a description thereof will not be repeated herein.

Figure 5:
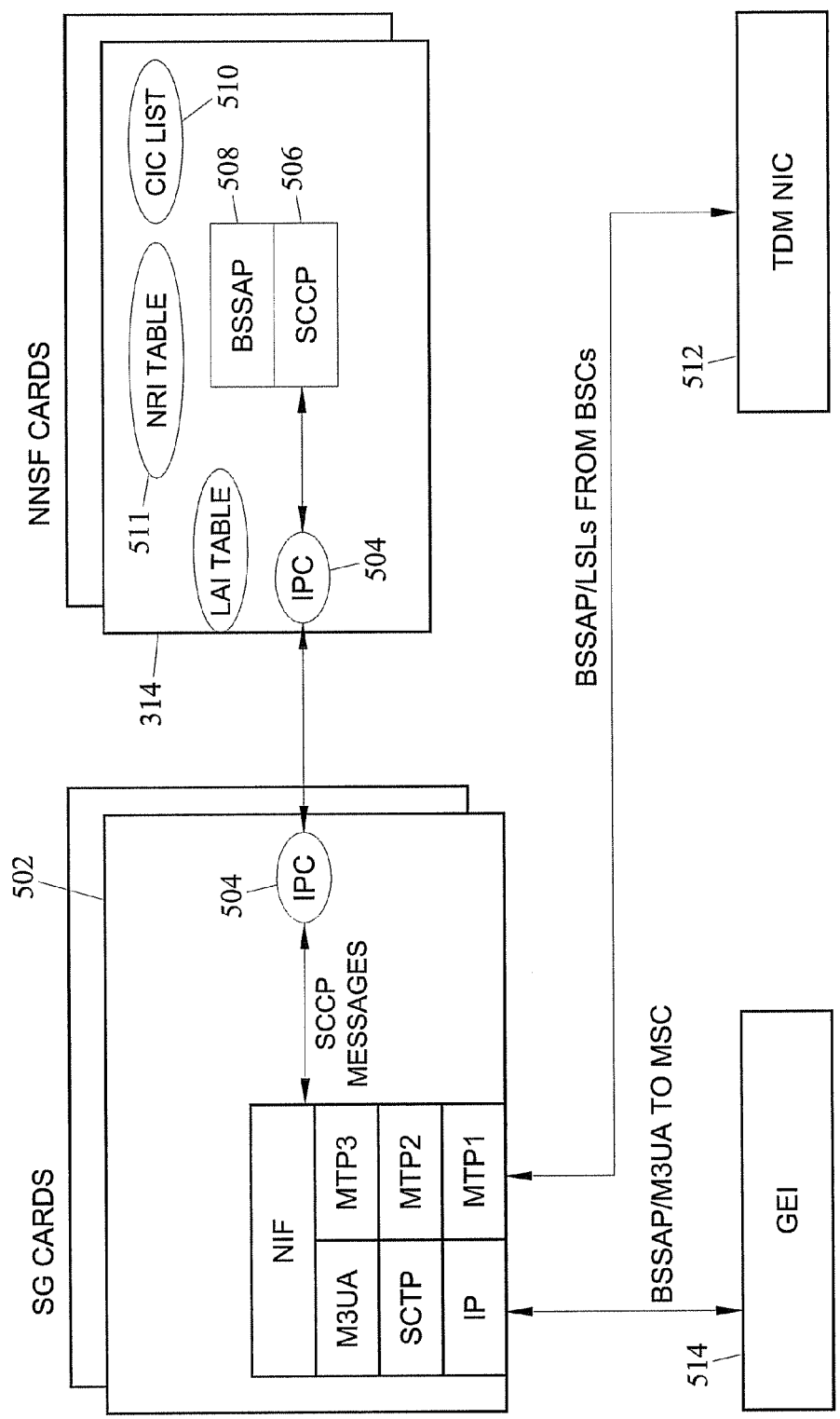
FIG. 5 is a block diagram illustrating an exemplary NNSF architecture according to an embodiment of the subject matter described herein.

FIG. 5 is a block diagram illustrating an exemplary NNSF architecture according to an embodiment of the subject matter described herein. Referring to FIG. 5, each NNSF 314 may reside on a circuit board that is associated with a signaling gateway 502, or implemented on a separate circuit board. NNSF 314 may communicate with signaling gateway 502 through inter-processor communications 504. Each NNSF 314 may implement both SCCP and BSSAP signaling layers 506 and 508. Each NNSF 314 may maintain a list of available bearer channels and corresponding MSCs, illustrated in FIG. 6 by circuit identifier code (CIC) list 510. The Network resource identity (NRI) table 511 stores NRIs for all CN nodes accessible by each NNSF 314. Each NNSF 314 may send and receive BSSAP signaling to and from BSCs and MSCs via a TDM network interface 512 or IP network interface 514.

Table 1 shown below illustrates an example of bearer circuit availability data that may be maintained by NNSF 314 according to an embodiment of the subject matter described herein.

TABLE 1

MSC CIC Availability Status Information

| CN Node | CICs/BSCs | | CICs status |
|---|---|---|---|
| MSC1 | CIC1 | BSC1 | available |
|  | CIC2 | BSC1 | available |
|  | CIC3 | BSC2 | available |
|  | CIC4 | BSC2 | available |
| MSC2 | CIC6 | BSC1 | blocked |
|  | CIC7 | BSC1 | available |
|  | CIC8 | BSC2 | busy |
|  | CIC9 | BSC2 | available |

Table 1 shown above illustrates exemplary CIC availability that may be maintained for MSCs or other core network nodes. In the illustrated example, the first column includes MSC identifiers. In practice, each MSC may be identified by any suitable network identifier, such as an NRI, a point code, or an IP address. The next column includes CICs that are assigned to each MSC and the corresponding BSCs with the CICs are associated. In the illustrated example, MSC1 has CIC1 and CIC2 with BSC1 and CIC3 and CIC4 with BSC2. Similarly, MSC2 has CIC6 and CIC7 with BSC1 and CIC8 and CIC9 with BSC2. If the NNSF with which Table 1 is associated receives an initial layer 3 message from BSC1, the NNSF may determine from the stored CIC status information that MSC1 has two CICs, CIC1 and CIC2, available for BSC1 and MSC2 has only one CIC available for BSC1. Using this availability status information, the NNSF may assign MSC1 to the mobile station for which the initial layer 3 message was sent. The NNSF may then forward the initial layer 3 message to MSC1, which returns a response to the message to BSC1.

Figure 7:
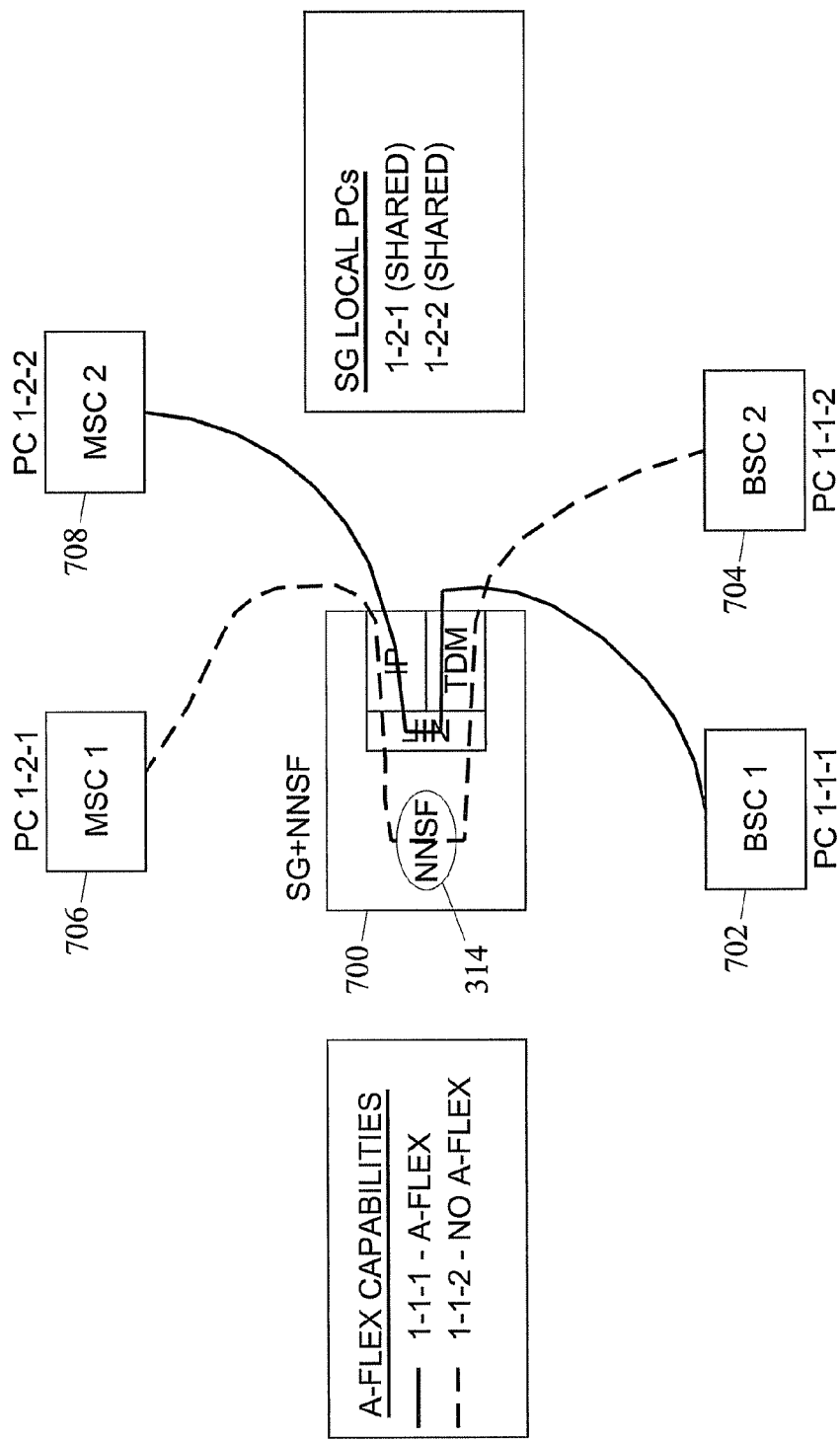
FIG. 7 is a network diagram illustrating the bypassing of NNSF functionality at a signaling gateway when NNSF functionality is included in the radio access node according to an embodiment of the subject matter described herein.

FIG. 7 is a message flow diagram illustrating exemplary MSC assignment by NNSF 314 according to an embodiment of the subject matter described herein. Referring to FIG. 7, in line 1, BSC 700 sends an SCCP connection request (CR) message to NNSF 314. If the connection request message contains a valid NRI that corresponds to one of the MSCs in the network, then the connection request corresponds to a mobile station that has already been assigned, e.g., due to a previous activation. However, if any of the following conditions are true, the NNSF may perform load sharing:

The TIMSI does not contain a valid NRI (no match in the static configuration data);
The TIMSI contains the null NRI;
The initial layer three message does not contain a TIMSI (IMSI or IMEI used instead);

For all these cases the NNSF selects the MSC from available MSCs in the pool using the load balancing algorithm described herein, taking into account the MSC's reachability, service, and load redistribution states.

Figure 6:
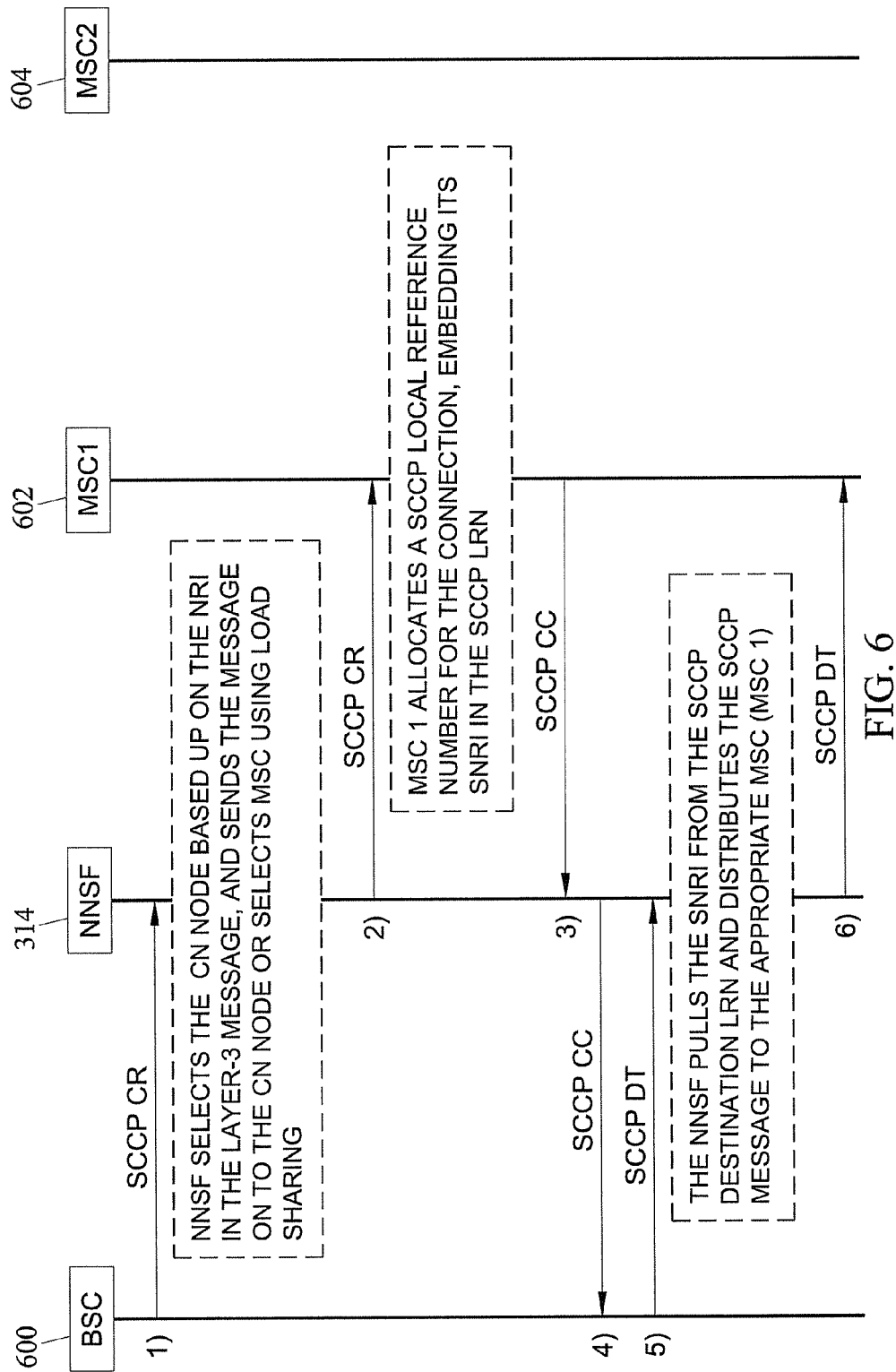
FIG. 6 is a message flow diagram illustrating exemplary messages exchanged between a BSC, an NNSF, and an MSC in assigning a mobile station to an MSC according to an embodiment of the subject matter described herein.

Returning to the message flow diagram in FIG. 6, in line 2, NNSF 314 sends the SCCP connection request to MSC 602. MSC 602 allocates an SCCP local reference number for the connection and embeds its SNRI in the SCCP LRN sent back in the SCCP connection confirm message in line 3. In line 4, the SCCP connection confirm message is sent from NNSF 314 to BSC 600. In line 5, BSC 600 sends an SCCP DT message to NNSF 314. NNSF 314 extracts the SNRI from the SCCP destination LRN and distributes the SCCP message to the appropriate MSC, MSC 602, as illustrated by line 6.

FIG. 7 is a network diagram illustrating an example where NNSF 314 is co-located with signaling gateway 700 and interfaces with a first BSC 702 that has A-flex or Iu-flex capabilities and a second BSC 704 that does not have A-flex or Iu-flex capabilities. As stated above, Iu-flex refers to the ability of a radio access node in a UMTS network to select between MSCs in a pool of MSCs. A-flex refers to the same capability in a GSM network where the radio access interface between the BSC and the MSC is referred to as the A or access interface, rather than the Iu interface.

Signaling gateway 800 may determine whether or not a message originates from a node with or without A-flex or Iu-flex capabilities by examining a configuration parameter associated with the address of the sending BSC that indicates whether Iu-flex or A-flex capabilities exist. If signaling gateway 700 determines that an initial layer 3 message originates from a node that has A-flex or Iu-flex capabilities, then NNSF function 314 is bypassed, and the message is forwarded to the appropriate MSC 706 or 708 identified in the message. In the illustrated example, the solid line from BSC 702 to MSC 708 represents the case where NNSF 314 is bypassed. If signaling gateway 700 receives a message from a node that does not have A-flex or Iu-flex capabilities, then the message is forwarded to NNSF 314, which selects the appropriate MSC using load sharing, as described above. The load sharing case is illustrated by the dashed line in FIG. 7.

Figure 8:
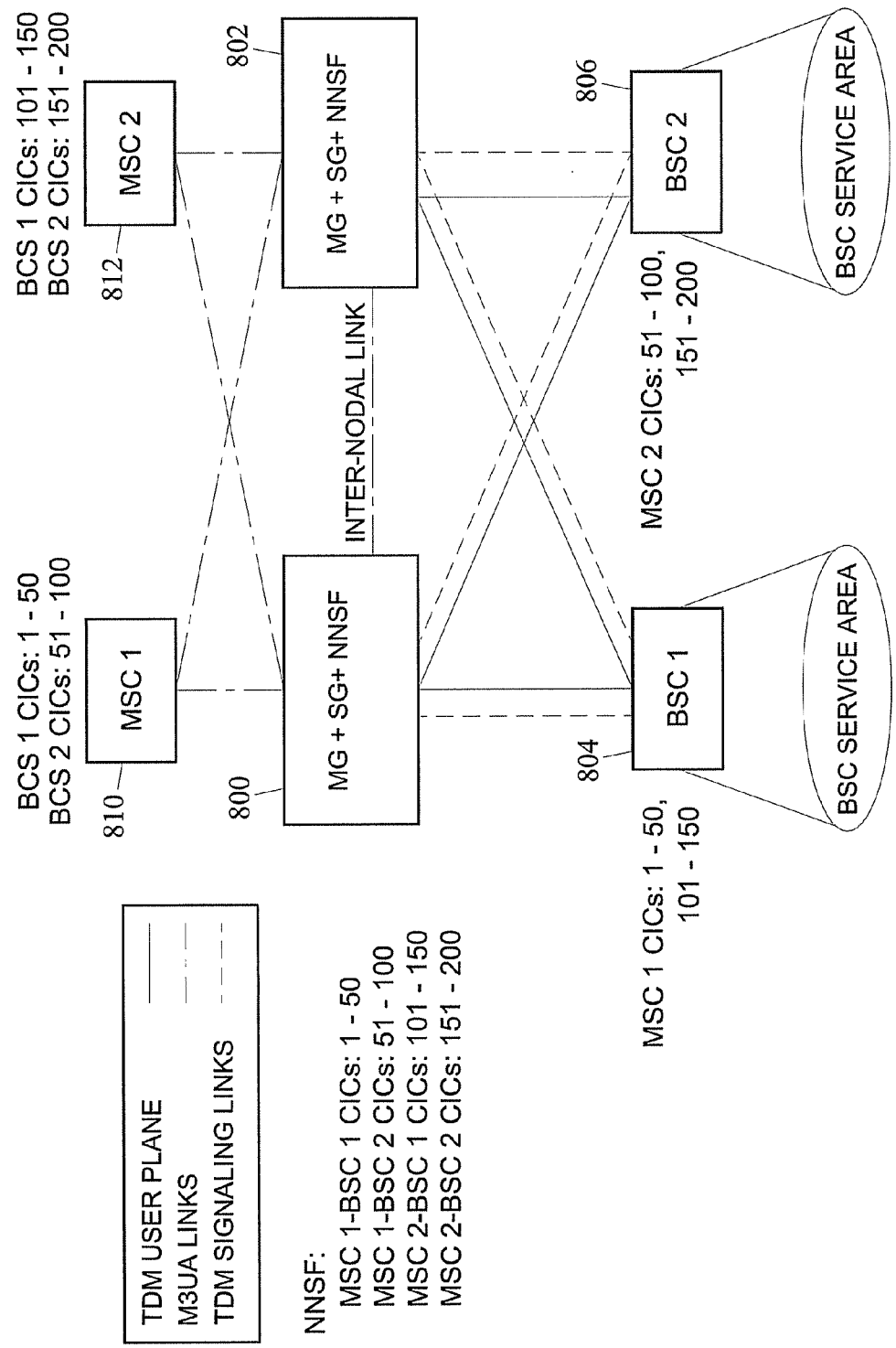
FIG. 8 is a network diagram illustrating transparent mapping of CICs by an NNSF according to an embodiment of the subject matter described herein.

FIG. 8 is a network diagram illustrating exemplary CIC assignments between BSCs and MSCs and the transparent mapping of CICs performed by each NNSF according to an embodiment of the subject matter described herein. In the illustrated example, each NNSF is a component of a combined MG/SG node 800 or 802. MG/SG nodes 800 and 802 interface between BSCs 804 and 806 and MSCs 810 and 812. BSC 804 has CICs 1-50 and 101-150 that it believes that BSC 804 associates with MSC 810. However, each NNSF maps CICs 101-150 to MSC2 512 transparently from BSC 804. Similarly, BSC 806 is assigned CICs 51-100 and 151-200 that BSC 806 associates with MSC2 812. However, the NNSFs of MG/SG nodes 800 and 802 map CICs 51-100 to MSC1 810. By transparently mapping CICs in the manner shown in FIG. 8, each NNSF is able to transparently load share assignment of mobile stations to MSCs without acquiring modification of the BSCs.

Figure 9:
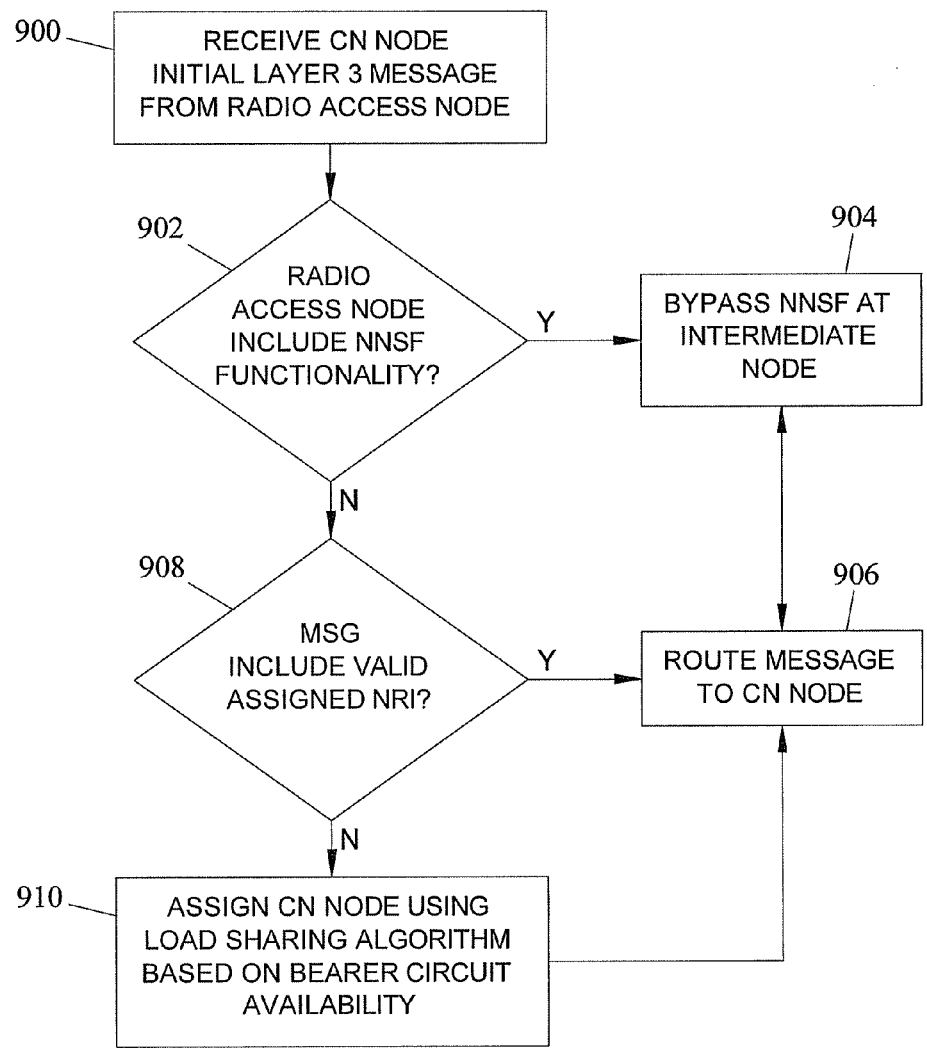
FIG. 9 is a flow chart illustrating exemplary steps for CN assignment according to an embodiment of the subject matter described herein.

FIG. 9 is a flow chart illustrating the exemplary overall steps that may be performed by an NNSF at an intermediate node according to an embodiment of the subject matter described herein. Referring to FIG. 9, in step 900, the NNSF receives an initial layer 3 message from a radio access node. For example NNSF 314 may receive an initial layer 3 message from a BSC. In step 902, it is determined whether the radio access node that originated the message includes NNSF functionality. If the NNSF determines that the radio access node has NNSF functionality, control proceeds to step 904 where the NNSF function at the intermediate node is bypassed and then to step 906 where the message is routed to the CN node specified by the message. In step 902, if it is determined that the sending radio access node does not include NNSF functionality, control proceeds to step 908 where it is determined whether the message includes a valid, assigned NRI. If the message includes a valid, assigned NRI, control proceeds to step 906 where the NNSF routes the message to the CN node specified by the NRI.

Returning to step 908, if the message does not include a valid, assigned NRI, control proceeds to step 910 where the core network node is assigned using a load sharing algorithm described herein based on bearer circuit availability. Control then proceeds to step 906 where the message is routed to the assigned CN node.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method, comprising:

monitoring, by a non-access stratum (NAS) node selection function (NNSF) node implemented via a computing platform including one or more processors, bearer circuit availability for each of a plurality of bearer circuits within each of a plurality of core network (CN) nodes; and in response to a message received from a radio access node due to activity by a mobile station within an area served by the radio access node, assigning the mobile station to a given one of the plurality of CN nodes by the NNSF node, the given CN node selected in a load sharing manner based, at least in part, upon a determination that the given CN node has a greater number of bearer circuits available than at least another one of the plurality of CN nodes, wherein the NNSF node is located separately from the radio access node.

2. The method of claim 1, wherein the NNSF node is co-located with a signaling gateway.

3. The method of claim 1, wherein the NNSF node is co-located with a signaling gateway and a media gateway.

4. The method of claim 1, wherein monitoring bearer circuit availability includes tracking, for each of the plurality of bearer circuits of each of the plurality of CN nodes, bearer circuit assignments made by each respective CN node.

5. The method of claim 1, wherein monitoring bearer circuit availability includes monitoring bearer circuit maintenance and equipment failure messages originating from the radio access node.

6. The method of claim 1, wherein monitoring bearer circuit availabilities includes auditing each of the plurality of CN nodes for bearer circuit status information.

7. The method of claim 6, wherein the bearer circuit status information is configured to indicate an available status, a blocked status, or a busy status of a given bearer circuit, and wherein the given CN node has fewer of its bearer circuits in the blocked or busy status than another of the plurality of CN nodes.

8. The method of claim 1, wherein the radio access node comprises a base station controller (BSC) and wherein the plurality of CN nodes comprise mobile switching centers (MSCs).

9. The method of claim 1, further comprising mapping, by the NNSF node, a bearer circuit identifier that the radio access node associates with another one of the plurality of CN nodes to the given CN node in a manner transparent to the radio access node.

10. The method of claim 1, further comprising determining, by the NNSF node, that another message received from another radio access node indicates that the other radio access node has A-flex or Iu-flex capability and, in response, bypassing the assigning operation for the other message.

11. A network node implemented, at least in part, via a computer-based system having one or more processors, the network node comprising:

at least one network interface circuit configured to receive a message from a radio access node in response to activity by a mobile station within an area served by the radio access node; and a non-access stratum (NAS) node selection function (NNSF) circuit operably coupled to the at least one network interface circuit, the NNSF circuit configured to identify an availability of each of a plurality of bearer circuits provided by each respective one of a plurality of core network (CN) nodes and to assign the mobile station to a selected one of the plurality of CN nodes in a load sharing manner based, at least in part, upon a determination that the selected CN node has a greater number of bearer circuits available than at least another one of the plurality of CN nodes, wherein the network node is distinct from the radio access node.

12. The network node of claim 11, wherein the network node includes a signaling gateway.

13. The network node of claim 11, wherein the network node includes a signaling gateway and a media gateway.

14. The network node of claim 11, wherein to identify the availability of each of the plurality of bearer circuits, the NNSF circuit is further configured to track bearer circuit assignments made by each of the plurality of CN nodes.

15. The network node of claim 11, wherein to identify the availability of each of the plurality of bearer circuits, the NNSF circuit is further configured to audit each of the plurality of CN nodes for bearer circuit status information.

16. The network node of claim 15, wherein the bearer circuit status information is configured to indicate an available status, a blocked status, or a busy status of a given bearer circuit, and wherein the selected CN node has fewer of its bearer circuits in the blocked or busy status than any other of the plurality of CN nodes.

17. The network node of claim 11, wherein to identify the availability of each of the plurality of bearer circuits, the NNSF circuit is further configured to monitor bearer circuit maintenance and equipment failure messages originating from the radio access node.

18. The network node of claim 11, wherein the radio access node comprises a base station controller (BSC) and wherein the plurality of CN nodes comprise mobile switching centers (MSCs).

19. The network node of claim 11, wherein the NNSF circuit is further configured to map a bearer circuit identifier that the radio access node associates with another one of the plurality of CN nodes to the selected CN node in a manner transparent to the radio access node.

20. The network node of claim 11, wherein the network node is configured to determine whether another radio access node has A-flex or Iu-flex capability and, in response, allow a message received from the other radio access node to bypass at least a portion of the NNSF circuit.

21. A non-transitory computer readable medium having stored thereon executable instructions that, upon execution by a processor of a computer, cause the computer to:

monitor bearer circuit availability of each of a plurality of bearer circuits provided by each of a plurality of core network (CN) nodes;

receive a message from a radio access node in response to activity by a mobile station within an area served by the radio access node; and assigning assign the mobile station to a chosen one of the plurality of CN nodes in a load sharing manner based, at least in part, upon a determination that the chosen CN node has a greater number of bearer circuits available than at least another one of the plurality of CN nodes, wherein the computer is remotely located with respect to the radio access node.

* * * * *